Feb. 17, 1942.                R. L. GELINAS                2,273,753
                              ANTISKID DEVICE
                          Filed April 25, 1941           2 Sheets-Sheet 1
Fig. 1.
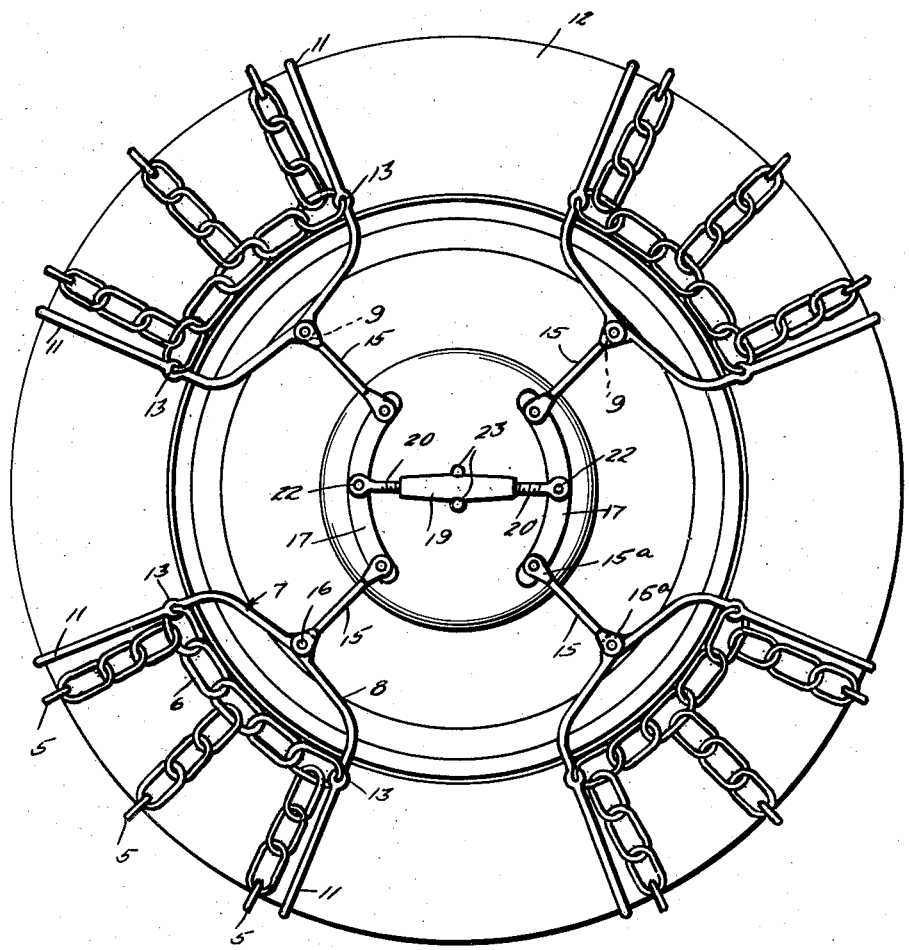
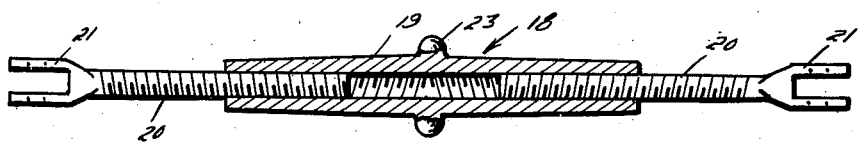
Fig. 6.
Inventor
Ralph L. Gelinas
By Clarence A. O'Brien
Attorney Feb. 17, 1942.    R. L. GELINAS    2,273,753
ANTISKID DEVICE
Filed April 25, 1941    2 Sheets-Sheet 2
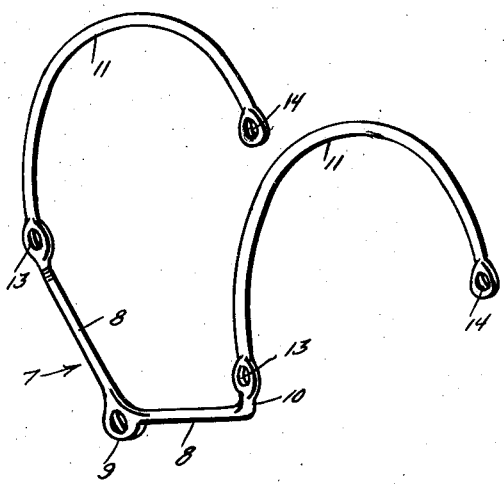
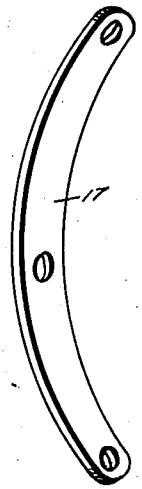
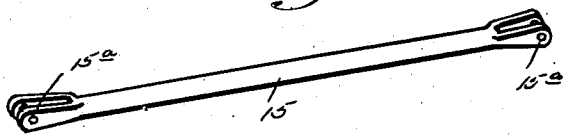
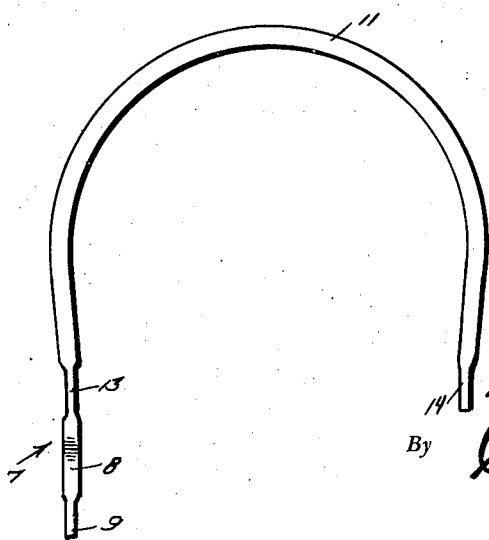
Inventor
Ralph L Gelinas
By Clarence A O'Brien
Attorney Patented Feb. 17, 1942

2,273,753

UNITED STATES PATENT OFFICE 2,273,753

ANTISKID DEVICE

Ralph L. Gelinas, East Stroudsburg, Pa.

Application April 25, 1941, Serial No. 390,389

3 Claims. (Cl. 152—231)

This invention relates to antiskidding devices for automobile tires and an object of the present invention is to improve generally upon such devices, and particularly to provide a device of this character which may be applied without requiring a great deal of skill, and under the most trying circumstances.

A further object of the invention is to provide a device of this character to the end that cross chains, found most desirable and effective for increasing purchase and preventing side skidding, can be used to more advantage than heretofore.

The invention together with its objects and advantages will be best understood from a study of the following description taken in connection with the accompanying drawings wherein:

Figure 1 is a side elevational view of a vehicle wheel equipped with anti-skid devices in accordance with the present invention.

Figure 2 is a perspective view of a frame forming part of the invention.

Figure 3 is a side elevational view of the frame.

Figure 4 is a perspective view of a link forming part of the invention.

Figure 5 is a perspective view of an arcuate plate forming part of the invention, and Figure 6 is a longitudinal sectional view through a turn buckle.

Referring more in detail to the drawings it will be seen that in accordance with the present invention I provide an antiskid device embodying a desired number of cross chains 5 connected respectively at their ends by side chains 6 of a suitable length and which length is determined by the number of cross chains 5.

Also in accordance with the present invention for each chain assembly there is provided a retaining frame 7.

The frame 7 which may be formed of metal rod or other suitable material embodies a pair of oppositely extending members 8—8 that diverge from an integral lug 9, and at a suitable point remote from the lug 9 are bent at an angle, as at 10, and from the point 10 merge into substantially U-shaped hooks 11 that engage over the tire casing 12 in a manner suggested in the drawings to snugly straddle the tire casing.

In the region of the pins 10 the frame members 8 are flattened and apertured to provide integral eyes 13 with which are connected the end links of one side chain 6.

At the free extremities of the hooks 11 there are formed eyes 14 with which are engaged the end links of the opposite side chain 6.

Also for each anti-skid device there is provided a link 15, the ends of which are bifurcated and one bifurcated end 15ᵃ is pivoted to the lug 9 as shown and indicated at 16.

Two or more such anti-skid devices may be employed.

In Figure 1 I have illustrated the employment of four such anti-skid devices.

Where, for example, four such anti-skid devices are employed resort is had to a pair of arcuate plates 17.

The plates 17 are disposed at opposite sides of the axial center of the wheel and each plate 17 is connected to a pair of anti-skid devices by pivoting the ends 15ᵃ of the links 15 to the plates 17 at the respective opposite ends of the plates as shown.

The plates 17 intermediate their respectve opposite ends are connected together through the medium of a turn buckle 18.

In the present instance the turn buckle 18 embodies an internally threaded sleeve 19 in which are threaded complementarily threaded shanks 20 to move in opposite directions relative to one another incidental to a turning movement of the sleeve 19 for effecting a projecting or retraction of the shanks 20 with respect to the sleeve 19.

On their free ends the shanks 20 are provided with integral rigid yokes 21 that, in the present instance, are shown to straddle the plates 17 and to be pivoted to the plates, as at 22.

Obviously, after the anti-skid devices have been properly positioned on the wheel the sleeve 19 of the turn buckle is rotated to draw the shanks 20 inwardly thereof and therefore draw the frame members 7 into positive engagement with the tire 12 to the end that the anti-skid devices will be securely retained on the tire for use.

Also in accordance with the present invention the sleeve 19 of the turn buckle is equipped on the periphery thereof, and intermediate its ends with teeth or projections 23 to facilitate the turning of the sleeve for contracting or expanding the turn buckle incidental to the securing of or the loosening of the anti-skid devices.

It is thought that the simplicity of the invention requires no further detailed description thereof.

Many advantages of an anti-skid device embodying the features of the present invention over known types of anti-skid devices are also believed to be apparent and will readily present themselves to the users.

Having thus described the invention what I claim is:

1. In a device of the character described, a tread chain unit embodying a plurality of cross chains, and relatively short side chains connecting the cross chains at the ends of the latter, and a retaining frame for said chain unit embodying a pair of frame members disposed in divergent relation and integral at one end with an apertured lug, and at points remote from said lug bent at an angle and respectively merging into a substantially U-shaped hook disposed in a plane at right angles to the plane of the associated frame member for straddling the vehicle wheel adjacent one end of the associated chain unit; and the side members of the chain unit respectively having the respective opposide ends thereof connected with the hooks to lie at opposite sides of the wheel with the cross chains of the unit disposed transversely of the tread of the wheel and substantially in parallelism with the hook members of said frame, and means for positively securing the frame in position on the vehicle wheel.

2. In a device of the class described, a plurality of tread chain units, each embodying a pair of side chains and cross chains connecting said side chains, a frame for each unit embodying a pair of integral frame members extending in divergent relation to one another, an integral lug and at points remote from said lug merging into substantially U-shaped hooks disposed in a plane at substantially right angles to said diverging frame members for straddling a vehicle wheel; each tread chain unit having one side chain thereof connected at its ends to the hook members at approximately the point of merger of said diverging frame members with said hook members, and a second side chain thereof connected at its respective opposite ends to the U-shaped hooks at the free ends of the latter; a turn buckle for connecting at least one pair of the frames and for drawing the frames into positive engagement with the tire, and links pivotally connecting the threaded shanks of the turn buckle with the lugs of the respective frames.

3. In a device of the class described, a plurality of tread chain units, each embodying a pair of side chains and cross chains connecting said side chains, a frame for each unit embodying a pair of integral frame members extending in divergent relation to one another, an integral lug and at points remote from said lug merging into substantially U-shaped hooks disposed in a plane at substantially right angles to said diverging frame members for straddling a vehicle wheel; each tread chain unit having one side chain thereof connected at its ends to the hook members at approximately the point of merger of said diverging frame members with said hook members, and a second side chain thereof connected at its respective opposite ends to the U-shaped hooks at the free ends of the latter; a pair of arcuate plates, links pivotally connected to the plates and to the lugs of the respective frames for connecting the frames in pairs to the plates, and a turn buckle pivotally connected at its respective opposite ends to said plates intermediate the respective opposite ends of the latter.

RALPH L. GELINAS.